US009620942B2

(12) United States Patent
Stinson

(10) Patent No.: US 9,620,942 B2
(45) Date of Patent: Apr. 11, 2017

(54) UTILITY KNIFE FOR CLEANING A CONDUCTOR

(71) Applicant: MADI, LLC, Greenville, SC (US)

(72) Inventor: Ralph Dudley Stinson, Lutz, FL (US)

(73) Assignee: MADI, LLC, Greenville, SC (US)

( * ) Notice: Subject to any disclaimer, the term of this patent is extended or adjusted under 35 U.S.C. 154(b) by 0 days.

(21) Appl. No.: 14/045,873

(22) Filed: Oct. 4, 2013

(65) Prior Publication Data

US 2014/0096326 A1    Apr. 10, 2014

Related U.S. Application Data

(60) Provisional application No. 61/710,348, filed on Oct. 5, 2012.

(51) Int. Cl.
*H02G 1/12* (2006.01)
*B25F 1/04* (2006.01)
*B26B 11/00* (2006.01)

(52) U.S. Cl.
CPC ............ *H02G 1/1204* (2013.01); *B25F 1/04* (2013.01); *B26B 11/00* (2013.01)

(58) Field of Classification Search
CPC ..... B26B 11/00; B26B 11/001; B26B 11/006; B26B 11/008; B25F 1/00; B25F 3/00; B25F 1/04; B25F 1/003; B25B 21/007; A46B 15/0055; A46B 15/0065; A46B 15/0079; A46B 15/0081; H02G 1/12; H02G 1/1204
USPC ...... 7/158, 118, 159, 100, 105, 107; 30/161; 15/105, 111, 104.04, 160, 200
See application file for complete search history.

(56) References Cited

U.S. PATENT DOCUMENTS

| 181,206 | A | * | 8/1876 | Richardson | 15/111 |
| 515,742 | A | * | 3/1894 | Bultzingslowen | B23B 31/18 279/35 |
| 1,486,190 | A | * | 3/1924 | Lopez | H01T 21/04 15/104.011 |
| 3,147,840 | A | * | 9/1964 | Brookhouser | B41J 29/17 15/111 |
| 3,267,507 | A | * | 8/1966 | Cox | H02G 1/02 15/160 |
| 4,375,115 | A | * | 3/1983 | Zimmerman | A46B 9/02 15/104.04 |
| 4,570,341 | A | * | 2/1986 | Konneker | B26B 1/042 30/151 |
| 4,796,325 | A | * | 1/1989 | Bortman | 15/167.2 |
| 4,856,132 | A | * | 8/1989 | Burns | A63B 57/00 7/114 |
| 4,899,409 | A | * | 2/1990 | Cox, Jr. | 7/167 |
| D309,377 | S | * | 7/1990 | Taylor | D4/130 |
| D325,472 | S | * | 4/1992 | Premack | D4/128 |
| 5,313,376 | A | * | 5/1994 | McIntosh | F21V 33/0084 362/119 |
| 5,438,726 | A | * | 8/1995 | Leite | A46B 7/04 132/309 |
| 5,495,673 | A | * | 3/1996 | Gardiner | B26B 29/025 30/155 |

(Continued)

*Primary Examiner* — Hadi Shakeri
(74) *Attorney, Agent, or Firm* — Trego, Hines & Ladenheim, PLLC

(57) ABSTRACT

A utility knife for cleaning a conductor is disclosed herein. The utility knife includes a housing having first and second ends, a blade connected to the first end of the housing, and a brush connected to a second end of the housing.

11 Claims, 10 Drawing Sheets

(56) References Cited

U.S. PATENT DOCUMENTS

| | | | | |
|---|---|---|---|---|
| 5,727,319 | A * | 3/1998 | Myerchin | B26B 11/008 30/123 |
| 5,857,234 | A * | 1/1999 | Hernnandez | 15/111 |
| 5,887,347 | A * | 3/1999 | Gibbs | 30/161 |
| 5,956,788 | A * | 9/1999 | Henke | B44D 3/164 7/105 |
| 6,223,372 | B1 * | 5/2001 | Barber | 7/118 |
| 6,698,048 | B1 * | 3/2004 | Greene | 7/158 |
| 7,063,435 | B2 * | 6/2006 | Dallas | B25F 1/04 30/123 |
| 7,174,590 | B1 * | 2/2007 | Quenzi | B25F 1/003 30/160 |
| 8,707,490 | B1 * | 4/2014 | Pelton | B26B 1/00 30/123 |
| 2004/0064909 | A1 * | 4/2004 | Locklear | 15/160 |
| 2007/0245497 | A1 * | 10/2007 | Tsuda | B24D 15/084 7/120 |
| 2009/0000046 | A1 * | 1/2009 | Oh | A46B 9/02 15/160 |
| 2009/0172950 | A1 * | 7/2009 | Jenkinson | A01G 3/00 30/155 |
| 2010/0186175 | A1 * | 7/2010 | Watson | 7/158 |
| 2011/0308027 | A1 * | 12/2011 | Major | B05C 17/0227 15/145 |
| 2014/0173842 | A1 * | 6/2014 | Davis | A46B 9/028 15/160 |

* cited by examiner

UTILITY KNIFE FOR CLEANING A CONDUCTOR

BACKGROUND OF THE INVENTION

This application relates to a utility knife for cleaning a conductor and, more particularly, to a utility knife having an integrated wire brush to allow a lineman to clean a conductor before making a connection.

When repairing utility lines, linemen often times have to use connectors to splice and join two sections of a conductor together—connection point. If the conductor is dirty, then the conductor needs to be cleaned prior to using the connector to join the two section of the conductor. If not cleaned, a dirty conductor can cause several problems such as outages, excessive heat at the connection point, and open neutrals which may cause appliances in homes to burn up.

Often times when linemen are working on utility lines, they do not have the proper tool to clean the conductor so they use the back of their utility knife to scrape the conductor. Unfortunately, not only does the scraping not get the conductor properly cleaned, but the scraping can cause damage to the aluminum conductor.

BRIEF SUMMARY OF THE INVENTION

Accordingly, there is a need for a utility knife that allows a lineman to properly clean a conductor prior to making a connection with a connector and that eliminates the need for a lineman to carry multiple tools.

According to one aspect of the invention, a utility knife includes a housing having first and second ends, a blade connected to the first end of the housing, and a brush connected to a second end of the housing.

According to another aspect of the invention, a utility knife includes a housing having a first end and a second arcuate end, a blade pivotally connected to the first end of the housing, and a wire brush supported by the second arcuate end. The wire brush conforms to the shape of the second arcuate end to allow the second arcuate end to receive an electrical conductor therein and allow the wire brush to clean the conductor.

According to another aspect of the invention, a utility knife includes a housing having a slot formed along a bottom of the housing and a recess formed along a top of the housing; a blade pivotally connected to a first end of the housing; and a brush supported by a second end of the housing to allow a user to clean a surface. The blade is pivotal between an open position where the blade extends beyond the housing to allow a user to use the blade and a closed position where the blade is received by the slot to store the blade in a non-use position.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
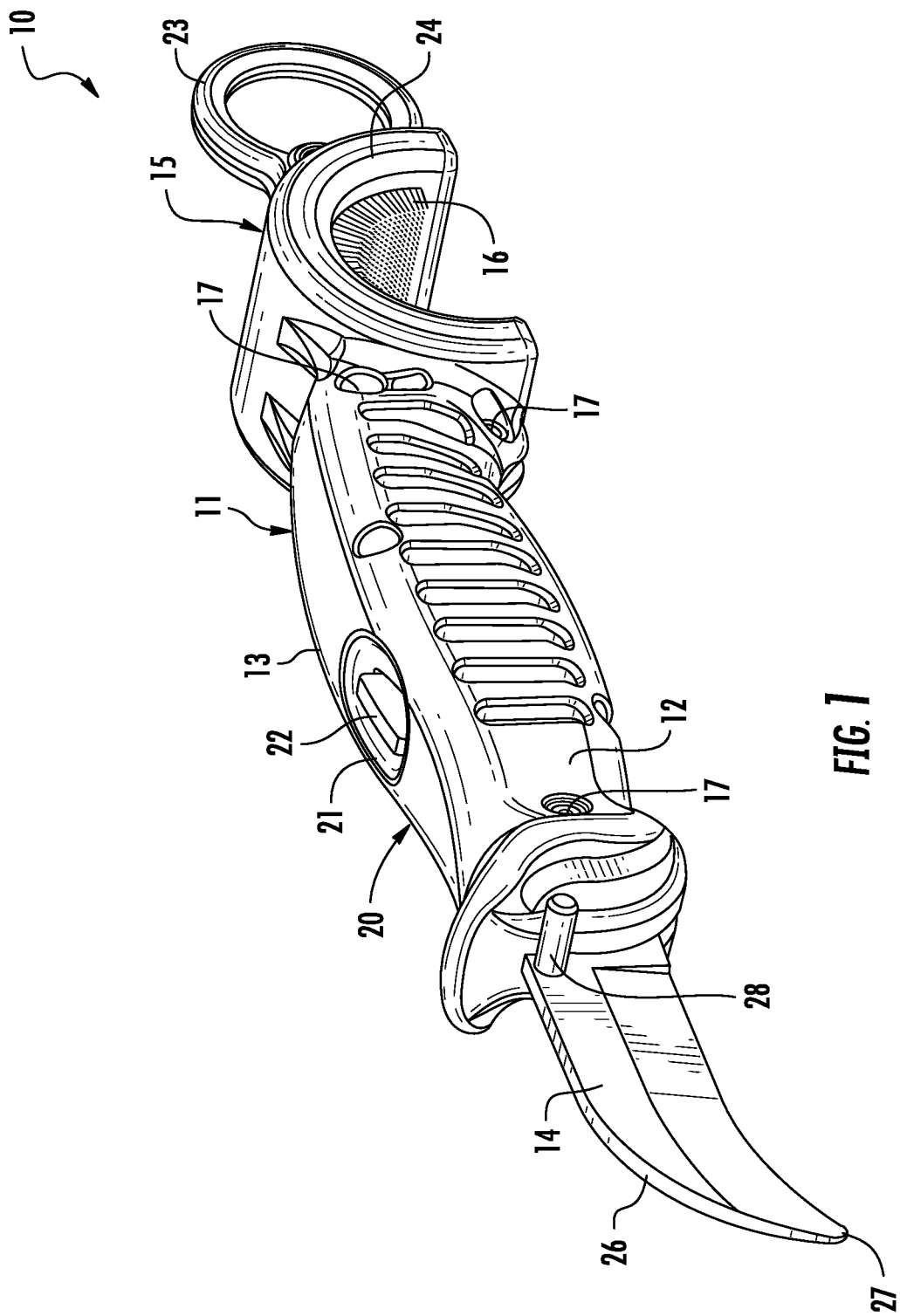
FIG. 1 is a perspective view of a utility knife for cleaning a conductor according to an embodiment of the invention.

Referring to the drawings, an exemplary utility knife according to an embodiment of the invention is illustrated in FIGS. 1-6 and shown generally at reference numeral 10. The utility knife 10 includes an outer split housing 11 having left 12 and right 13 sections, a blade 14 adapted to move between an open position, FIG. 1, and a closed position, FIG. 2, and a wire brush 16 positioned in a rear section 15 of the housing 11.

As shown, the left 12 and right 13 sections are connected by fasteners 17 extending therethrough to create the housing 11. As shown in FIG. 3, when connected, the left 12 and right 13 sections form a slot 18 along a bottom 19 of the housing 11 for allowing the blade 14 to retract into an interior of the housing 11 when moved to the closed position. Along a top 20 of the housing 11, a recess 21 is formed to allow a user to depress blade locking mechanism 22 which allows the blade to move from the open position, FIG. 1, to the closed position, FIG. 2.

The rear section 15 of the housing 11 provides an arcuate housing for supporting and encasing the wire brush 16. This allows the wire brush 16 to have an arcuate shape adapted to mate with an outer diameter of a conductor for efficient cleaning, FIG. 10. The right side of the rear section 15 is integrally formed with the right section 13 and the left side 24 of the rear section 15 is detachable from the left 12 and right 13 sections of the housing to allow the wire brush 16 to be easily replaceable. A non-conductive snap ring 23 is also connected to the rear section 15 to allow the knife 10 to be hung from a support without concern for arcing or other electrical hazards.

The blade 14 has rounded back or top 26 to discourage a user from scraping an aluminum conductor during cleaning and a blunted tip 27 to prevent injury. The blade 14 is black oxide coated to provide maximum durability and sharpness. A reversible thumb stud 28 is also provided for quick one handed opening of the blade 14 from the left or right side.

Figure 7:
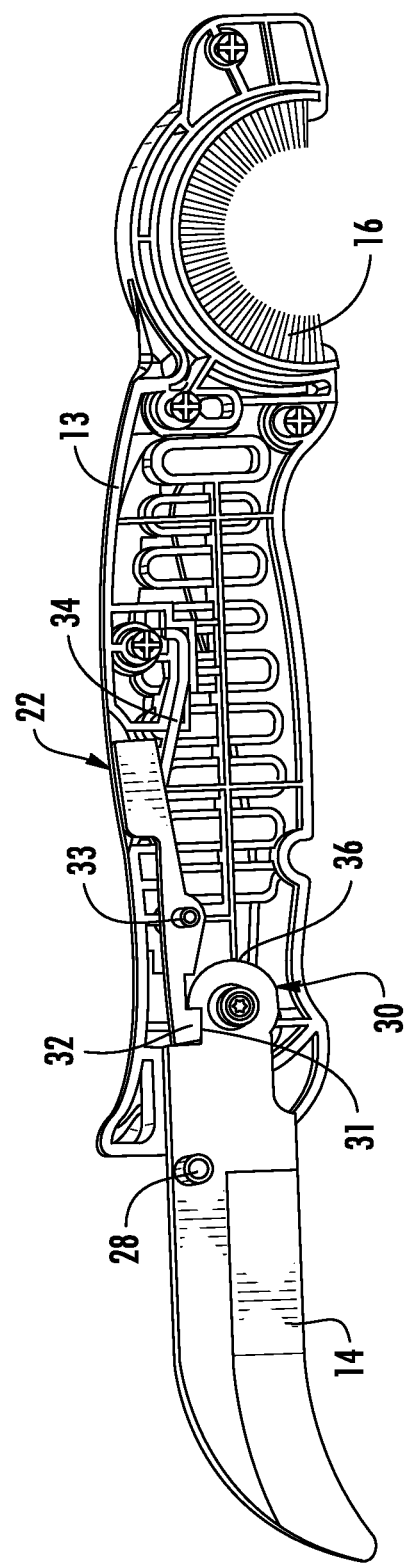
FIGS. 7-9 show internal workings of the utility knife of FIG. 1.
Figure 8:
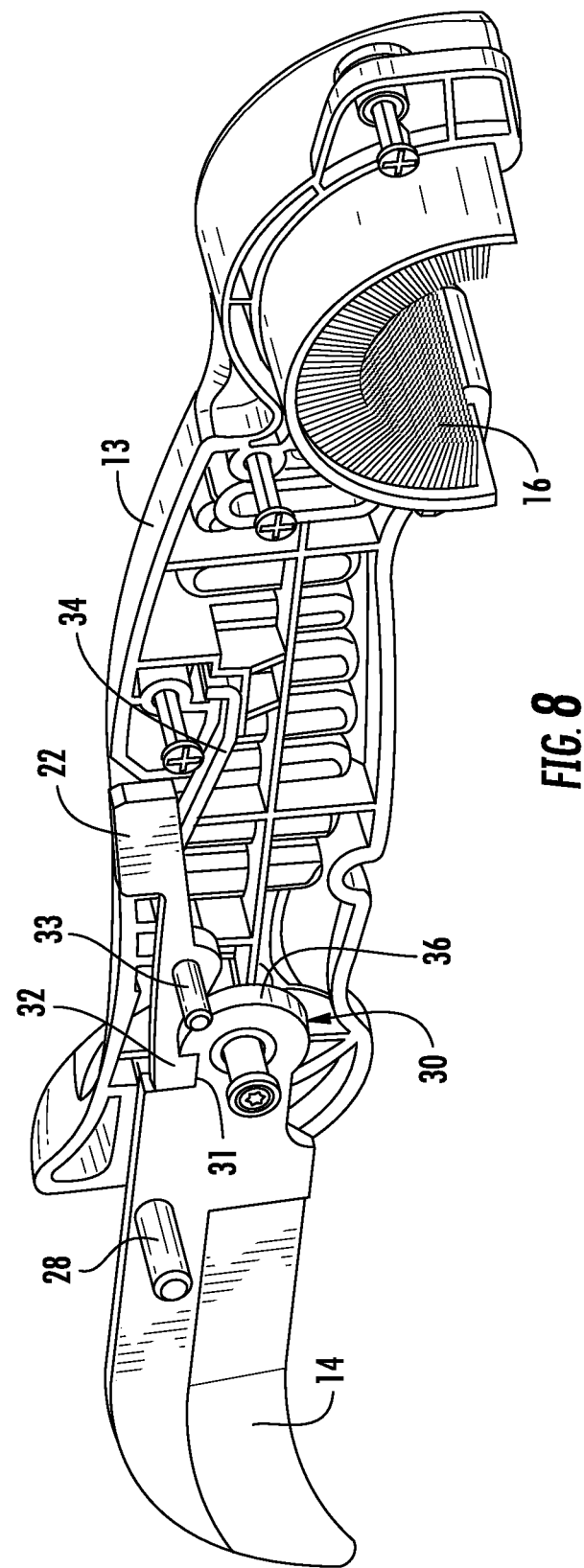
Figure 9:
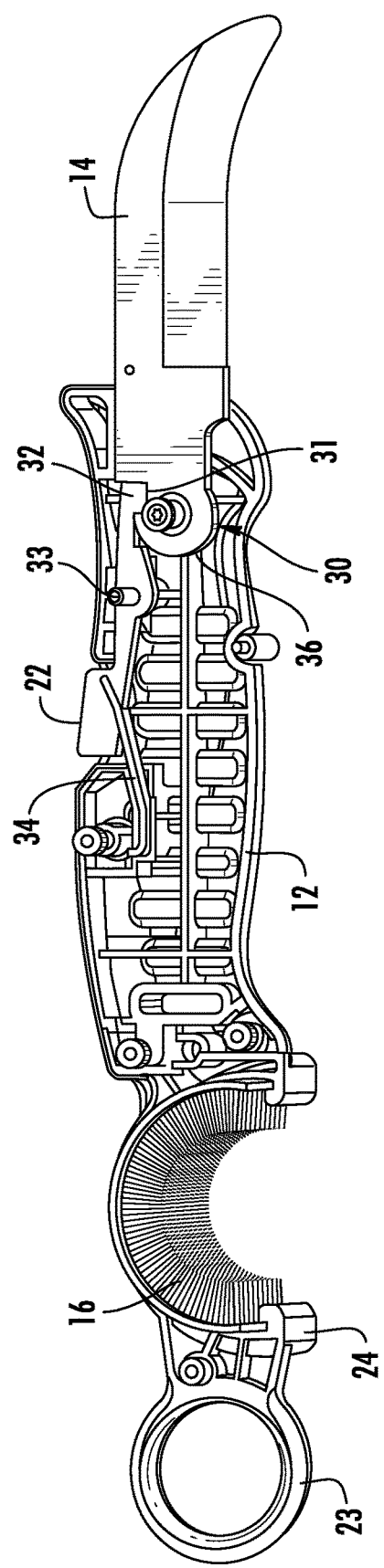

Referring to FIGS. 7-9, the blade 14 is designed to lock in an open position to prevent accidental closing of the blade which could cause serious injury. The blade 14 includes a pivot end 30 with a notch 31 adapted to mate with a tang 32 of the blade locking mechanism 22. As shown, the blade locking mechanism 22 is pivotally mounted about pivot 33 and biased towards a locking position by spring mechanism 34. In operation, when moving the blade 14 from the closed position, FIG. 2, to the open position, FIG. 7, the tang 32 rides along an outside edge 36 of the pivot end 30 until the blade 14 reaches the open position. Once the blade 14 reaches the open position, the tang 32 slides into the notch 31 to lock the blade 14 in the open position. As discussed above, the spring mechanism 34 provides a spring force to keep the tang 32 in mating engagement with the notch 31.

Figure 2:
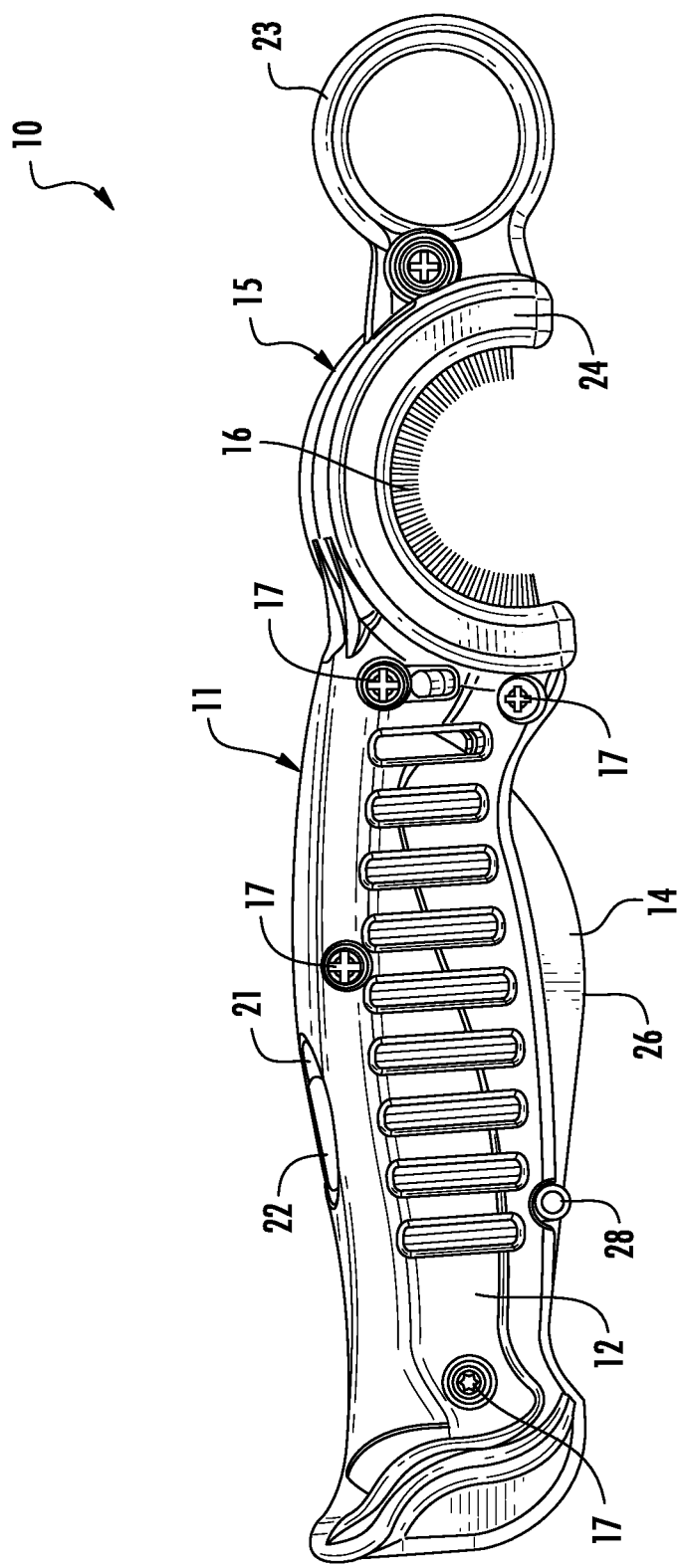
FIG. 2 shows the utility knife of FIG. 1 in a closed position.
Figure 3:
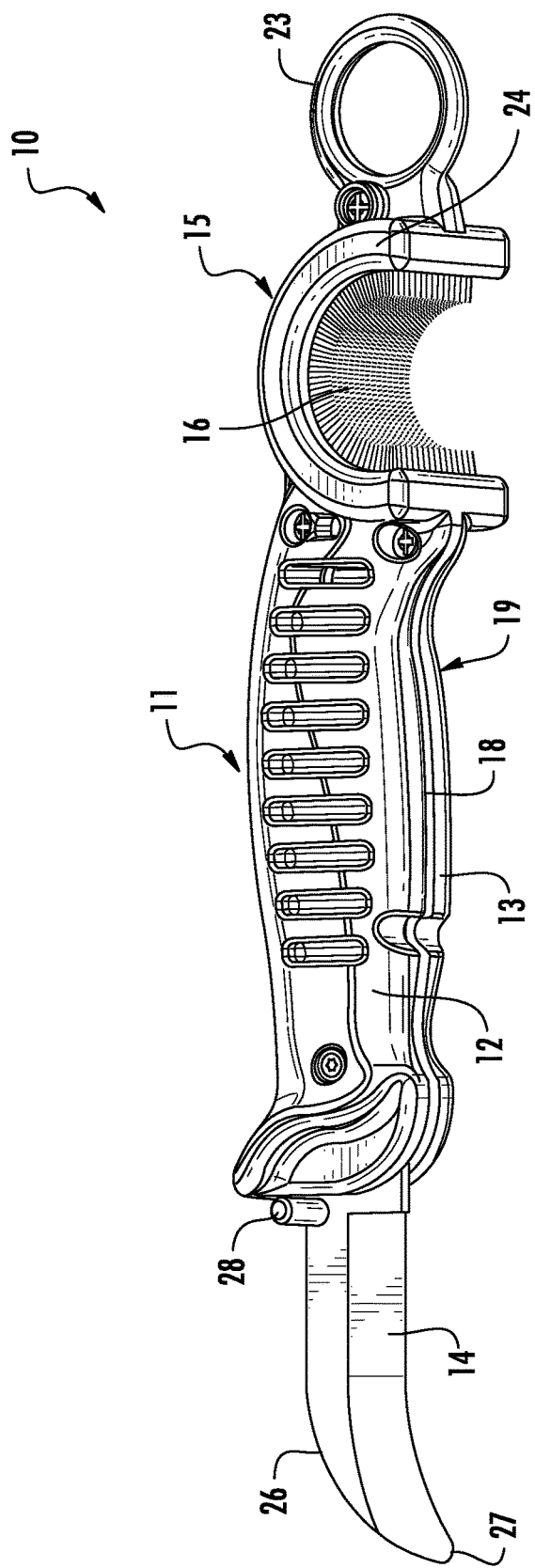
FIGS. 3-6 show various views of the utility knife of FIG. 1.
Figure 4:
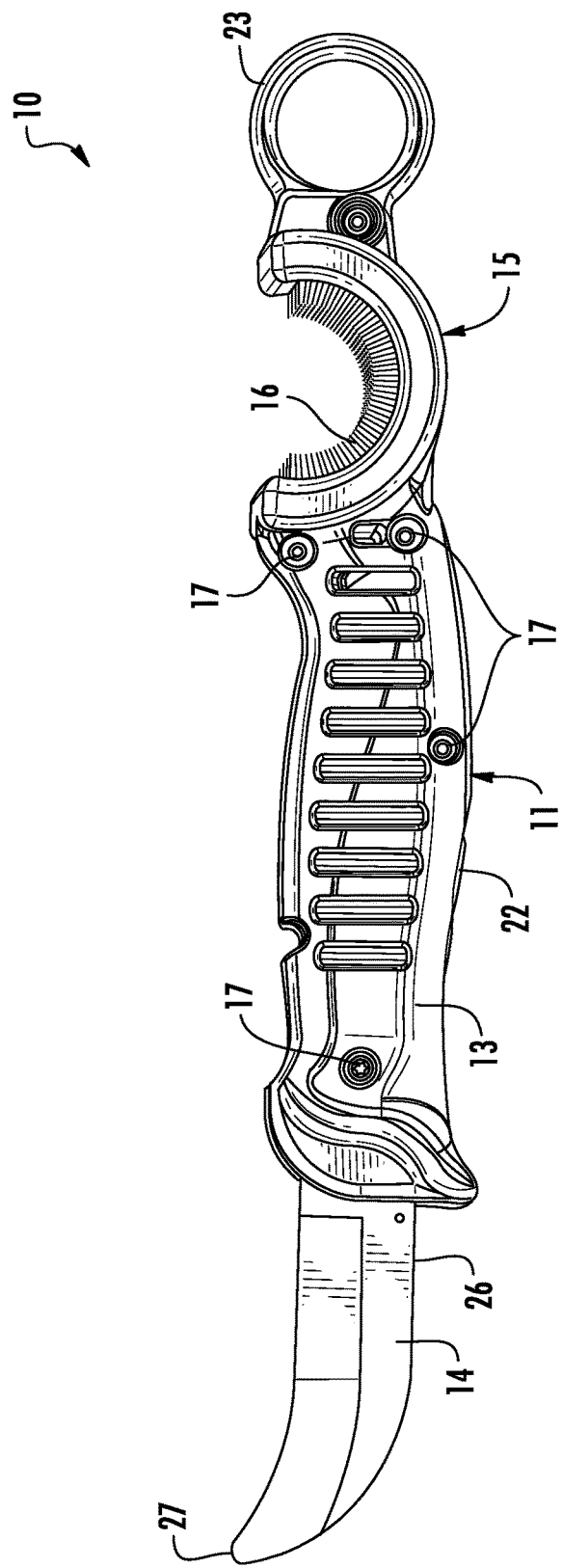
Figure 5:
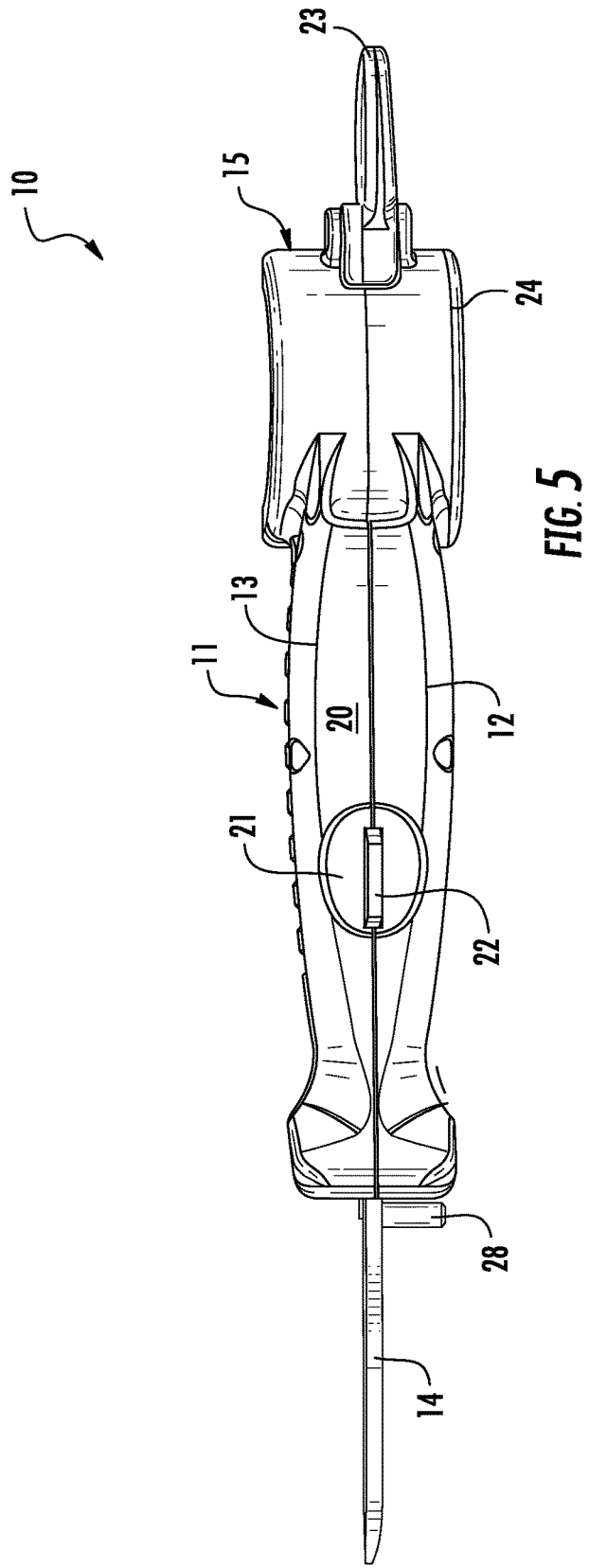
Figure 6:
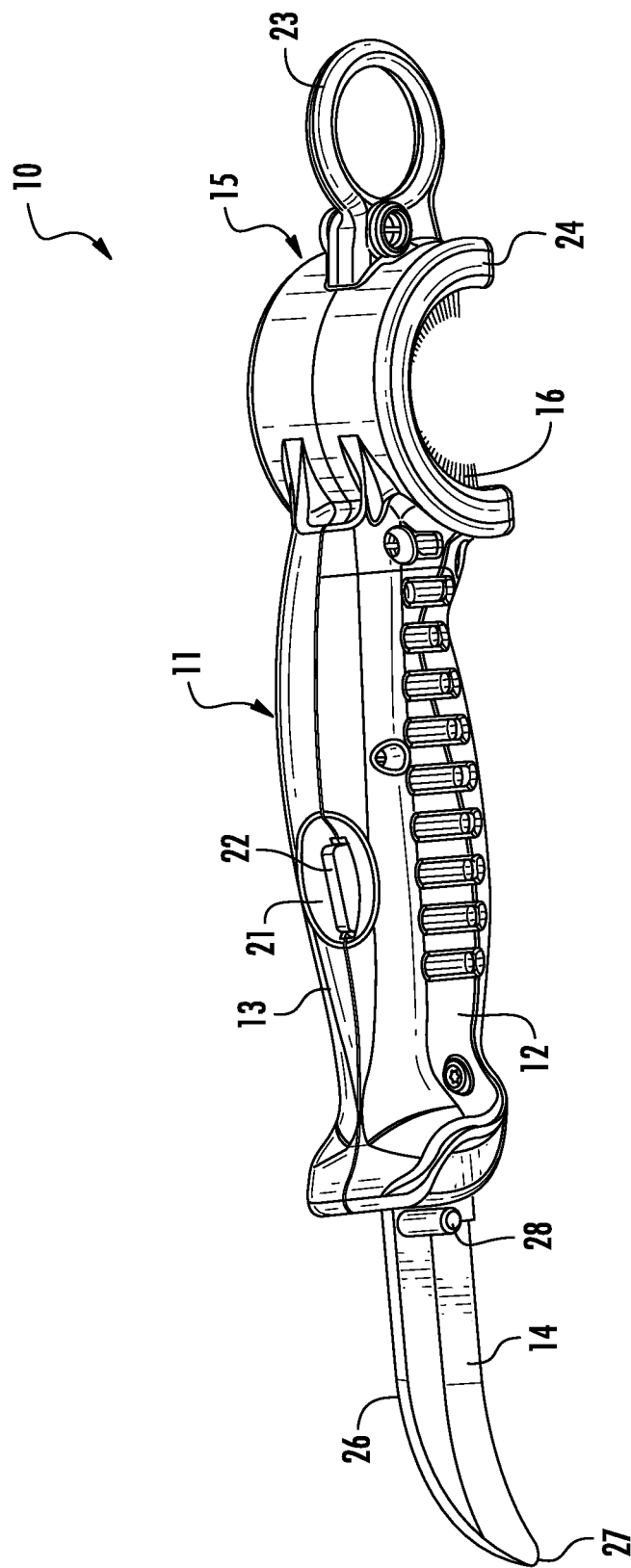

To close the blade 14, a user depresses the blade locking mechanism 22, thereby causing the tang 32 to disengage the notch 31, thereby allowing a user to move the blade 14 from the open position to the closed position, FIG. 2.

Figure 10:
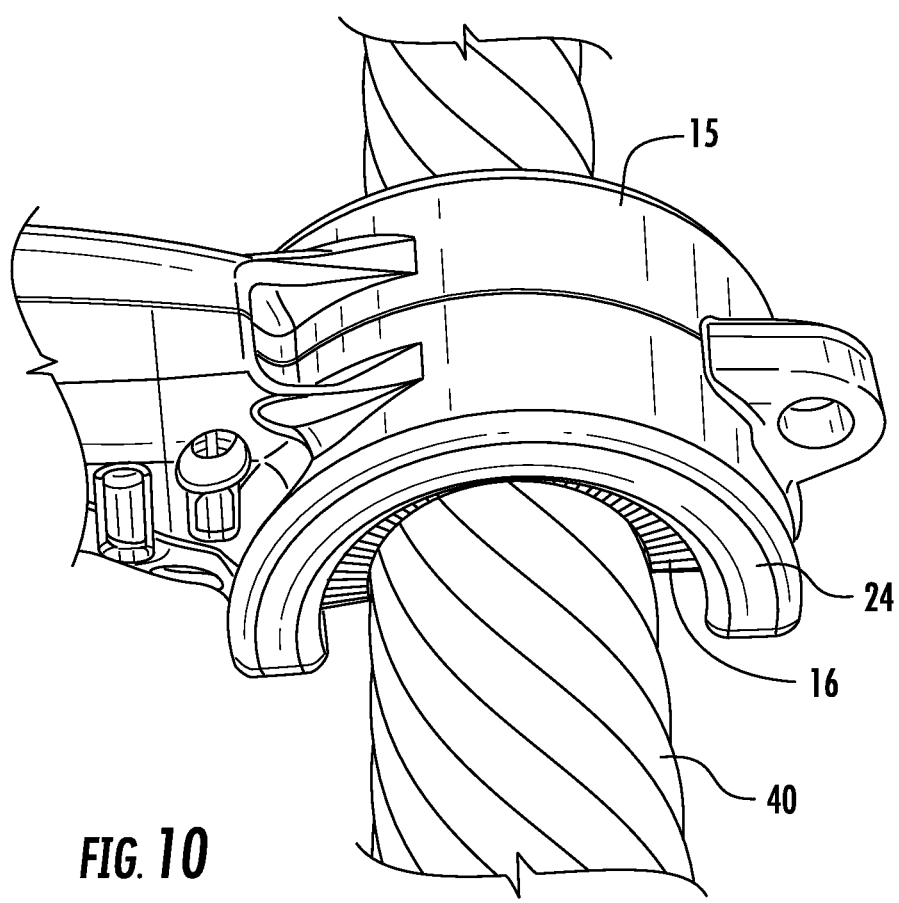
FIG. 10 shows a wire brush of the utility knife of FIG. 1 being used on a conductor.

As shown in FIG. 10, to clean a conductor 40, a user simply rotates the knife 10 in his/her hand and places the wire brush 16 over the conductor 40. Because of the arcuate shape of the wire brush 16, the wire brush 16 is in mating engagement with the conductor 40 to provide proper cleaning of the conductor 40. The wire brush 16 may be used on conductors up to 1000 MCM.

The foregoing has described a utility knife for cleaning a conductor. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A lineman's utility knife for cleaning electrical conductors, comprising:
    (a) a split housing formed by a first section and a second section connected together, the housing having a first end and a second semi-circular end;
    (b) a blade pivotally connected to the first end of the housing;
    (c) a semi-circular wire brush supported by the second semi-circular end, the semi-circular wire brush extending along an inside surface of the second semi-circular end such that a length of the semi-circular wire brush is fully contained by the second semi-circular end, wherein the second semi-circular end and semi-circular wire brush define an opening having a semi-circular cross-section to receive an electrical conductor having a circular cross-section and extending perpendicular to a major length of the housing therein and allow the wire brush to clean the conductor by rotating the semi-circular wire brush thereabout; and
    (d) wherein a first side of the second semi-circular end is integrally formed with the first section of the housing and a second side of the semi-circular end is detachable from the first and second sections of the housing to permit the wire brush to be replaced.

2. The knife according to claim 1, wherein the first and second section form a slot along a bottom of the housing to receive the blade in a closed position.

3. The knife according to claim 1, further including a blade locking mechanism, wherein the blade locking mechanism prevents the blade from moving from an open use position to a closed non-use position.

4. The knife according to claim 3, wherein the housing includes a recess along a top of the housing to allow a user to depress the blade locking mechanism and allow the blade to pivot from the open use position to the closed non-use position.

5. The knife according to claim 1, wherein the blade includes a thumb stud to allow a user to quickly move the blade for a closed non-use position to an open use position using one hand.

6. The knife according to claim 1, further including a snap ring connected to the second semi-circular end to allow the knife to be hung from a support.

7. A lineman's utility knife for cleaning electrical conductors, comprising:
    (a) a housing having a first section and a second section, wherein when connected together, the first section and the second section form a slot along a bottom of the housing and a recess along a top of the housing;
    (b) a blade pivotally connected to a first end of the housing, wherein the blade is pivotal between an open position where the blade extends beyond the housing to allow a user to use the blade and a closed position where the blade is received by the slot to store the blade in a non-use position; and
    (c) a semi-circular wire brush supported by a second semi-circular end of the housing, the semi-circular brush being configured to receive and mate with an outer diameter of an electrical conductor extending perpendicular to a major length of the slot to allow a user to clean the electrical conductor along its length, wherein a first side of the second semi-circular end is integrally formed with the first section of the housing and a second side of the semi-circular end is detachable from the first and second sections of the housing to permit the wire brush to be replaced.

8. The knife according to claim 7, further including a blade locking mechanism to prevent the blade from pivoting from the open position to the closed position during use.

9. The knife according to claim 8, wherein the blade locking mechanism includes:
    (a) a tang configured to mate with a notch in the blade; and
    (b) a spring mechanism to bias the blade locking mechanism towards a locking position where the tang engages the notch, wherein when the blade is pivoted from the open position to the closed position, the tang rides along an outside edge of a pivot end of the blade.

10. The knife according to claim 8, wherein the recess allows a user to depress the blade locking mechanism, thereby disengaging the blade locking mechanism and allowing the blade to pivot from the open position to the closed position.

11. The knife according to claim 7, wherein the second semi-circular end of the housing includes first and second spaced-apart semi-circular surfaces, the first semi-circular surface defining an exterior of the second semi-circular end of the housing and the second semi-circular surface defining an open interior of the second semi-circular end of the housing, and wherein the semi-circular wire brush conforms to and is in contact with the second semi-circular surface to allow a user to clean the electrical conductor.

\* \* \* \* \*